United States Patent [19]

Kutman

[11] Patent Number: 4,736,218
[45] Date of Patent: Apr. 5, 1988

[54] CAMERA SUPPORT AND HOUSING

[75] Inventor: Arkady Kutman, Willowdale, Canada

[73] Assignee: M.S.E. Engineering Systems Ltd., Downsview, Canada

[21] Appl. No.: 895,026

[22] Filed: Aug. 8, 1986

[30] Foreign Application Priority Data

Oct. 24, 1985 [CA] Canada .................................. 493759

[51] Int. Cl.[4] ........................ G03B 17/56; H04N 5/26
[52] U.S. Cl. ........................................ 354/81; 358/108
[58] Field of Search ................... 358/108, 109; 354/64, 354/293, 173.1, 81

[56] References Cited

U.S. PATENT DOCUMENTS

| | | | |
|---|---|---|---|
| 685,463 | 10/1901 | Walkins | 354/64 |
| 2,464,067 | 5/1949 | Barker | |
| 3,258,595 | 6/1966 | Galante | 358/108 X |
| 3,638,502 | 2/1972 | Leavitt et al. | 358/109 X |
| 3,720,147 | 3/1973 | Bemis | |
| 3,732,368 | 5/1973 | Mahlab | 358/108 |
| 3,916,097 | 10/1975 | Imai | 358/108 |
| 3,993,866 | 11/1976 | Peari et al. | |
| 4,160,999 | 7/1979 | Claggett | 358/108 |
| 4,217,606 | 8/1980 | Nordmann | 358/108 |
| 4,225,881 | 9/1980 | Tovi | 358/108 |
| 4,233,634 | 11/1980 | Adams | 358/229 |
| 4,320,949 | 3/1982 | Pagano | 354/81 |

FOREIGN PATENT DOCUMENTS 1267716 6/1961 France .................................. 354/64

OTHER PUBLICATIONS

Pelco Literature Entitled, "Super-Sphere Discreet Surveillance Enclosure".
Pelco Literature Entitled, "Model EH66, EH66X Environmental Enclosures".

Primary Examiner—Donald A. Griffin
Attorney, Agent, or Firm—Krass & Young

[57] ABSTRACT

A camera housing unit including an adjustable camera support means for supporting a camera and a protective, substantially opaque enclosure surrounding the support means and having an elongate opening therein. A separate, elongate transparent glass window covers the opening and defines a curved surface, the center of curvature of which is located on the optical centerline of the camera when the camera is mounted on the support means. The support means includes either manual or power means for pivoting the camera about the center of curvature of the curved surface in the plane of the longitudinal centerline of the window. The mounting means for the camera is supported by an inner post surrounded by an exterior sleevelike support on which the enclosure is mounted. The sleevelike support is mechanically isolated and spaced-apart from the inner post.

12 Claims, 15 Drawing Sheets

CAMERA SUPPORT AND HOUSING

BACKGROUND TO THE INVENTION

This invention relates to camera housing units and, in particular, a housing unit suitable for an outdoor surveillance or video monitoring camera.

Although surveillance cameras and protective housings therefor are known, various difficulties have been encountered with existing units on the market, particularly in connection with surveillance cameras used outdoors. Generally speaking, expensive surveillance cameras must be protected from damaging weather conditions when they are used outdoors. These cameras are generally protected by placing them in a housing that keeps the camera dry and free from dirt and dust. One difficulty encountered with surveillance cameras used outdoors arises from the need for a surveillance camera with a lens having a long focal length, for example 700 mm. Such lenses are very sensitive to any movement of the lens and a very slight movement during the picture taking process will make the picture unclear and even completely unusable. If there is a wind blowing and acting on the housing for the camera, the vibration of the housing can be transmitted to the camera and its lens, thus rendering the camera useless.

Another difficulty with known surveillance cameras arises from the use of clear plastic or Plexiglas to construct all or part of the housing. The use of a clear material is of course necessary for the camera to view the desired area from inside the housing. However, plastic and Plexiglas over a camera lens, and particularly a very precise lens designed to take a clear picture from a long distance, will cause distortion of the picture and this is particularly true after the housing unit has been in use for a period of time because hairline cracks soon develop in the plastic material. The use of clear glass would overcome this problem but up until now the use of such material has been found to be too expensive. It will be appreciated that if a glass dome or hemisphere is used in a surveillance camera system, it must itself be constructed to very close tolerances in order to avoid picture distortion.

Although spherical housing units for surveillance cameras are known for indoor units, they have not been used in the past for outdoor units, possibly due to the difficulty of manufacturing a spherical unit that can withstand outdoor weather conditions and that has the required features inside the dome to keep the camera in good working order. There is a distinct advantage to the use of a spherical housing unit outdoors in that a sphere is the best aerodynamic shape, that is, it provides the least wind resistance on average when one takes into account the fact that the wind can blow from any direction. Because of the smaller air resistance created by the sphere, a spherical housing unit is less likely to be damaged by high wind conditions and will not vibrate as much as a unit of a different shape might.

A known housing assembly for a surveillance camera is that taught in U.S. Pat. No. 4,320,949 issued March 23, 1982, to R. Pagano. The housing has an upper portion in the shape of a truncated dome over which rain water may flow. The bottom of the dome is a clear hemispherical member. The mounting for the surveillance camera is connected directly to the mounting for the upper portion of the housing so that any vibration of the housing will be transmitted directly to the camera and its lens. The housing unit is fitted with a fan to ventilate the housing and electrical heaters that are connected to a thermostatically controlled switch. When the temperature approaches freezing, the heaters are energized so as to heat the air in the housing assembly.

Another surveillance camera housing unit and support is shown in U.S. Pat. No. 3,732,368 issued May 8th, 1973 to Telesphere Technology, Inc.. This patent discloses a spherical housing for a T.V. camera that can be both tilted and panned for viewing. The tilting motor tilts both the T.V. camera and the spherical enclosure, the latter being attached to a circular disk member that divides the housing in half. The camera lens views the outside through a small circular orifice covered by a screen. The panning motor is located outside the housing and may indeed be positioned above a ceiling member. The single panning motor rotates both the housing and the camera as a single unit.

Another spherical housing unit for a camera is taught in U.S. Pat. No. 4,225,881 issued Sept. 30, 1980 to Murray Tovi Designs, Inc.. The global housing is internally coated with a transparent nichrome layer that bonds a layer of highly reflective metal to the globe. A slot or transparent window is provided in the globe for the camera lens to see through. A highly sophisticated method is required to manufacture this globe.

Another U.S. patent that employs a spherical enclosure for a surveillance camera is U.S. Pat. No. 3,720,147 issued Mar. 13, 1973 to Setronics Corporation. The unit is designed for use in a store and can be attached to the ceiling of the store by means of a single pipe. The spherical shell is constructed from two complementary parts that can be made by molding transparent plastic sheet material such as Plexiglas. The interior surface of the housing is coated with a black paint except for an elongate window through with the camera views the surrounding area. The unit is fitted with separate scan and tilt motors for changing the position of the camera.

SUMMARY OF THE INVENTION

According to one aspect of the present invention, a surveillance camera housing unit comprises adjustable surveillance camera support means for supporting a surveillance camera and a protective, substantially opaque enclosure surrounding the support means, having an elongate opening therein, and having room therein to enclose a surveillance camera mounted on the support means. A separate, elongate, transparent, glass window is provided in and is attached to the enclosure and defines a curved surface, the centre of curvature of which is located on the optical centreline of the camera when the camera is mounted on the support means. This window covers the elongate opening in the enclosure. The support means includes means for pivoting a surveillance camera mounted thereon about the centre of curvature of the curved surface in a vertical plane.

According to another aspect of the invention, a surveillance camera housing unit comprises an inner post and means for adjustably mounting a surveillance camera at an end of the post. The unit also includes a protective enclosure for the camera and an exterior sleevelike support on which the enclosure is mounted and through which the inner post extends. The sleevelike support is mechanically isolated and spaced apart from the inner post.

In a preferred embodiment of this housing unit, the mounting means includes first power means for tilting the surveillance camera about a horizontal axis and a second power means for panning the camera about a vertical axis. The first power means is mounted on a bracket member that is connected to and rotatable by the second power means. The second power means is mounted on the inner post.

According to a further aspect of the invention, a camera housing unit includes a camera support mechanism having means for attaching a camera thereto, means for mounting the support mechanism for rotation about a selected axis, and first power means for panning the support mechanism about this selected axis. A protective, generally opaque enclosure surrounds the camera support mechanism and is capable of enclosing a camera mounted on the support mechanism. The enclosure has a transparent window arranged in one side thereof. Means are provided for mounting the enclosure for rotation about the selected axis and second power means are provided to rotate the the enclosure about this axis. Control means operate the second power means in order to maintain the window in front of a lens at the front of the camera.

Further features and advantages will become apparent from the following detailed description when considered in conjunction with the accompanying drawings.

BRIEF DESCRIPTION OF THE DRAWINGS

FIG. 5b is a sectional detail taken along the line V—V of FIG. 5a;

DETAILED DESCRIPTION OF PREFERRED EMBODIMENT

Figure 1:
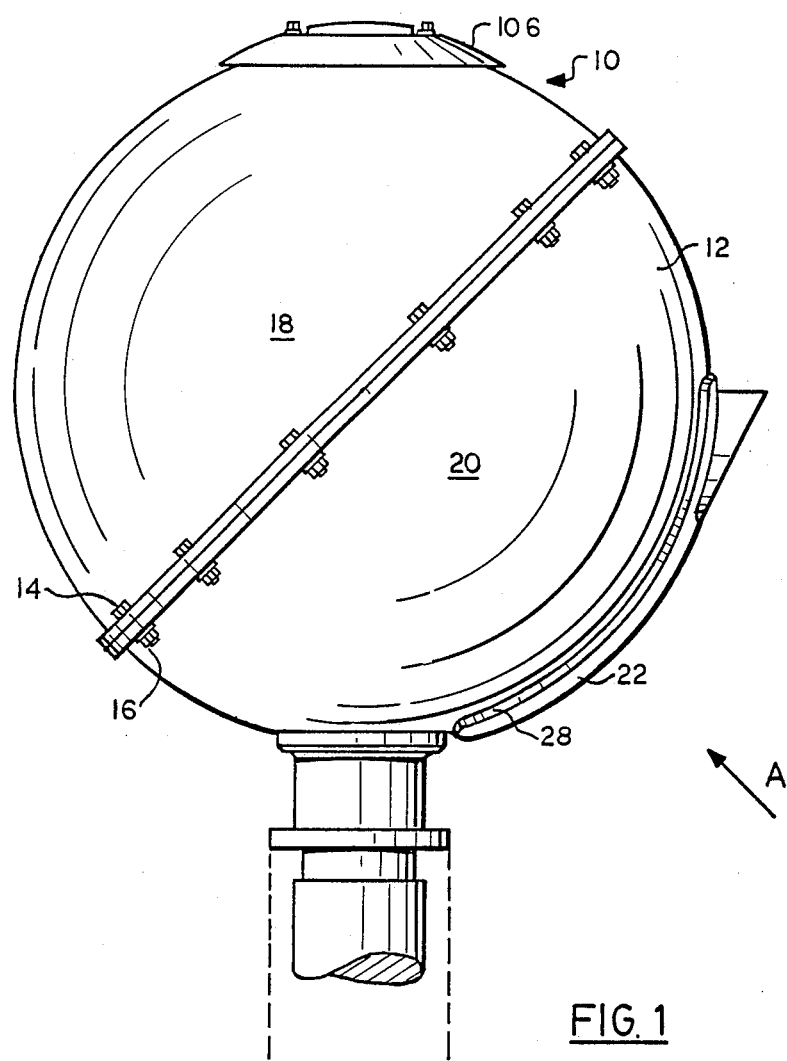
FIG. 1 is a side elevation of a surveillance camera housing unit constructed in accordance with the invention.
Figure 3:
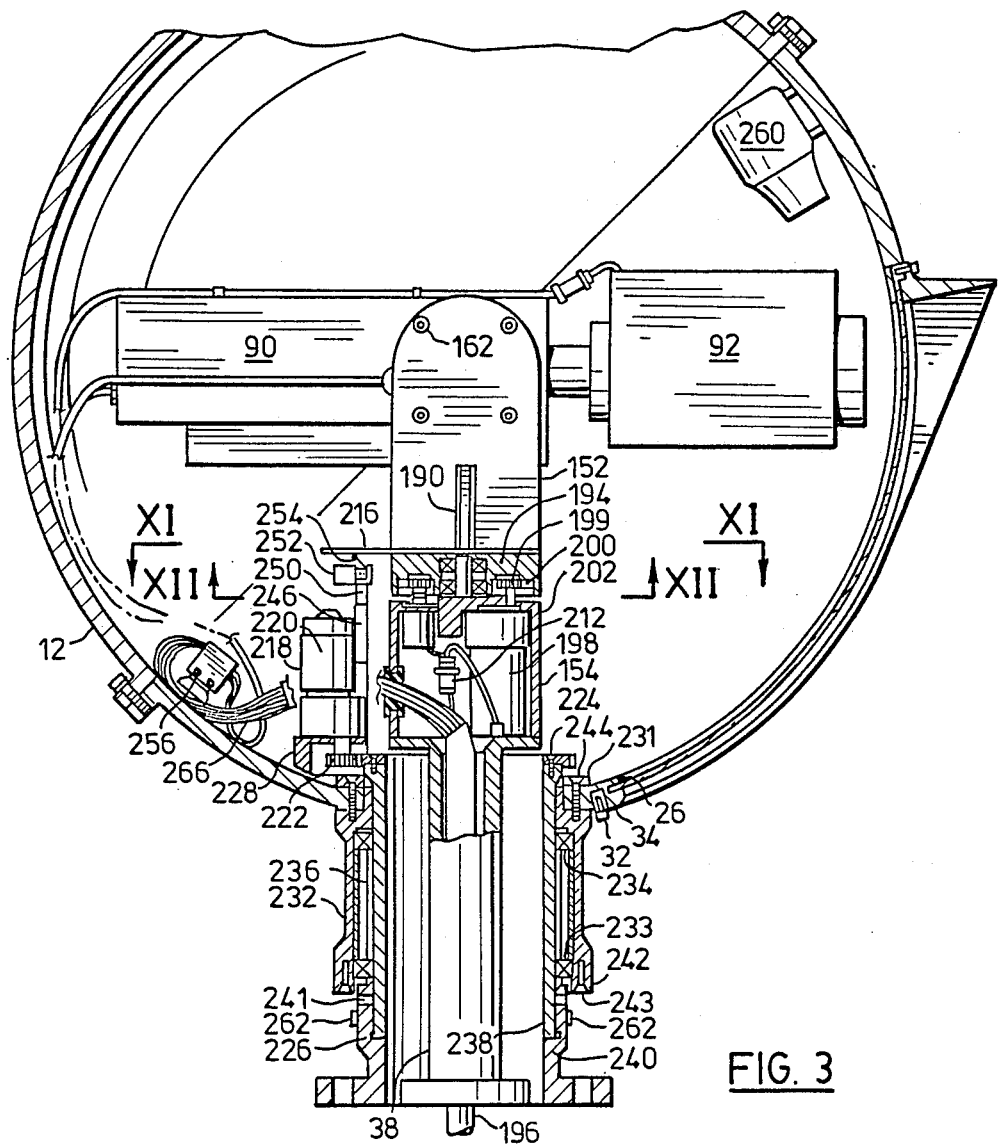
FIG. 3 is a side elevation, partially in section, showing an embodiment of the invention having motor drives for panning and tilting the camera and lens.

In FIG. 1, a surveillance camera housing unit 10 includes a protective, substantially opaque enclosure 12 surrounding a camera support means such as that shown in FIG. 3. The enclosure is preferably spherical so as to provide an aerodynamic shape which has minimum wind resistance no matter what direction the wind may have. In a preferred embodiment the enclosure is made of fiberglass and by well known manufacturing techniques. The enclosure 12 can be opened for access to the camera and its support by removing a series of bolts 14 and nuts 16. As can be seen from FIG. 1, the enclosure 12 comprises two hemispherical sections 18 and 20 that are detachably connected together by the aforementioned bolts and nuts. The sections 18 and 19 are joined along a plane disposed at an acute angle to the horizontal, which angle in the preferred illustrated embodiment is approximately 45 degrees. A glass window 22 is located in the lower section 20. The lower section 20 has an elongate opening 24 formed therein and over this opening the glass window 22 extends as can be seen most clearly in FIG. 3. The section 20 is formed with a lip 26 around the opening 24 and against this lip the edge of the glass window rests as shown in FIG. 3. The window 22 is held in place on the enclosure by a detachable flange member 28 which can also be made from fiberglass. The flange member 28 can have a hood section 30 (see FIG. 5) to reduce the amount of sunlight, rain and airborne debris striking the window. The member 28 is connected to the enclosure by a series of bolts 32 that thread into bushings 34 embedded in the section 20. The glass window 22 can either have a cylindrical surface or a spherical surface but a cylindrical surface is preferred from the standpoint of costs.

Figure 2:
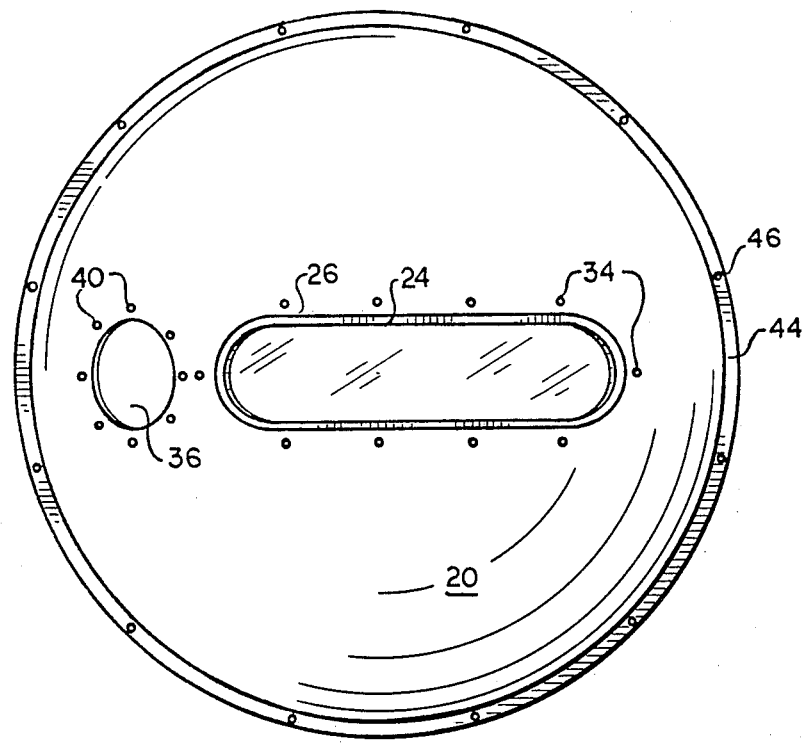
FIG. 2 is a bottom view taken in the direction of the arrow A in FIG. 1 showing the construction of the lower half of the spherical housing, the glass window therein being removed and the member being detached from its sleevelike support.

Also shown in FIG. 2 is a circular opening 36. This opening, which is located close to one end of the opening 24 is provided to permit passage of an inner support post 38 (FIG. 3) or 50 (FIG. 5) on which the camera and its supporting mechanism is mounted. Bolt holes 40 are formed in the section 20 around the hole 36 to provide means for attachment of the section 20 to a supporting post or sleeve as described hereinafter. Extending around the circumference of the section 20 is a connecting flange 44 having bolt holes 46 herein. A similar connecting flange 48 is provided on the upper section 18 of the enclosure.

Figure 5:
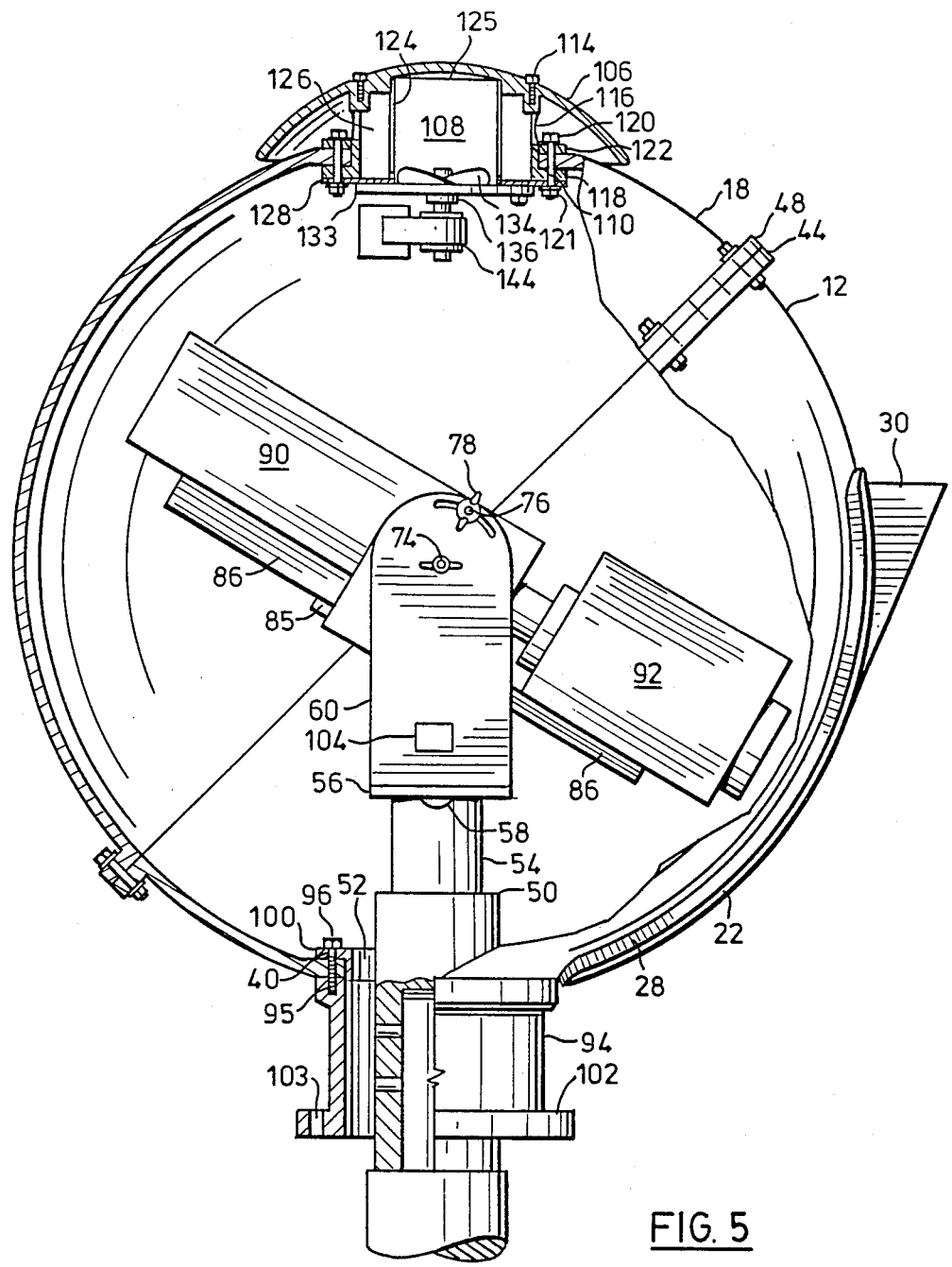
FIG. 5 is a side elevation, partially in section, of the housing unit of FIG. 1 with the surveillance camera mounted on a manually adjustable support mechanism.
Figure 5A:
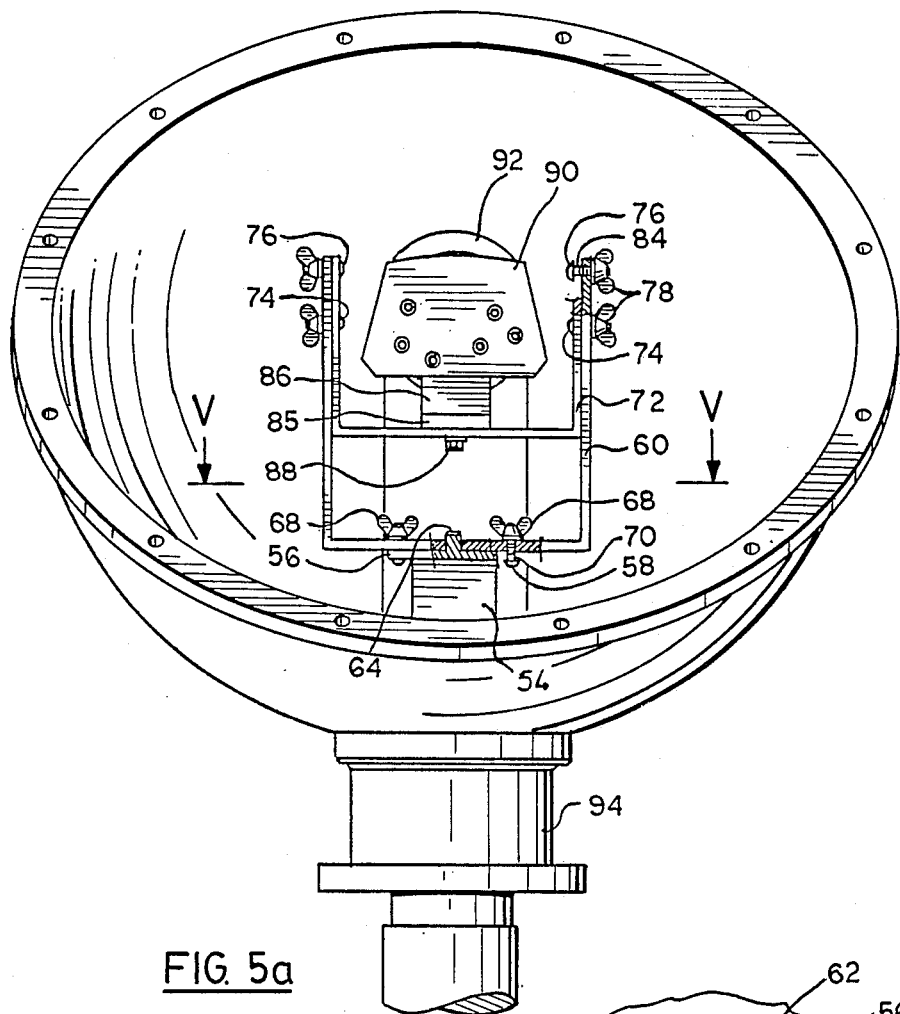
FIG. 5a is a side elevation, taken from the left side of FIG. 1, wherein the upper half of the spherical housing has been removed and a surveillance camera can be seen mounted to the manually adjustable support mechanism of FIG. 5.
Figure 5B:
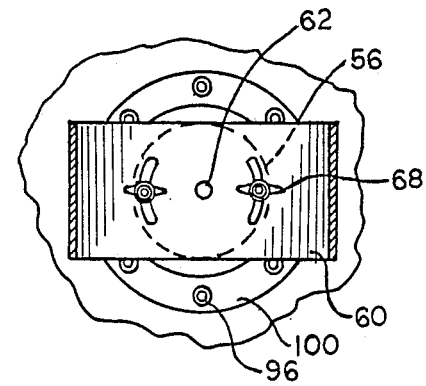

FIGS. 5 and 5a of the drawings illustrate one form of adjustable surveillance camera support means for supporting a surveillance camera. In this embodiment the support means can be adjusted manually and this embodiment is intended for those applications where the camera will remain in the same position for relatively long periods of time. It will be appreciated that it is necessary to remove the upper section 18 of the enclosure in order to make the necessary adjustments. The support means for the camera includes means for pivoting the camera about the centre of curvature of the curved surface of the glass window 22 in a vertical plane. The camera support means includes an inner post or pedestal 50 that extends into the enclosure 12 but is spaced apart therefrom by an annular gap 52. The post has a section 54 of reduced cross-section to facilitate the mounting of bolts 58. At the top of this reduced section is an annular flange 56. As shown in FIG. 5a, at least two square holes are provided in the flange 56 to accommodate the bolts 58, the heads of which rest against the bottom of the flange. Each bolt has a square cross-section in the region adjacent its head to prevent rotation of the bolt. Mounted on top of the post is an adjustable bracket 60 which is generaly U-shaped. A horizontal portion of the bracket 60 has a hole 62 in the centre thereof through which a very short shaft 64 of circular cross-section extends. The shaft 64 defines a vertical axis about which the bracket 60 is free to rotate to a limited extent. The aforementioned bolts 58 extend through arcuate slots 66 formed in the horizontal portion of the bracket 60. The degree of movement of the bracket 60 about the vertical axis is limited by the length of the slots. The bracket 60 is held in place by wing nuts 68 threaded onto the bolts 58. A washer and a lock washer can be used between each wing nut and the bracket 60.

Mounted on the bracket 60 is a smaller adjustable bracket 72 which also is generally U-shaped. It fits snuggly between the two upright sections of the bracket 60 and is attached thereto by two bolts 74 and two further bolts 76. All of these bolts are attached to the brackets by means of wing nuts 78. The bolts 74 extend through square holes in the smaller bracket 72 and through round holes 80 in the large bracket 60. The bolts 76 extend through square holes 82 in the smaller bracket 72 and through arcuate slots 83 in the bracket 60. Because the bolts 74 and 76 have a square cross-section 84 adjacent their heads, they are prevented from rotating relative to the smaller bracket 72 and this permits easy attachment of the wing nuts. It will be seen that by loosening all of the wing nuts 78, the bracket 72 can be pivoted about a horizontal axis that extends through the centre of the bolts 74.

In order to provide for the proper placement of the surveillance camera, a spacer 85 is mounted on the bracket 72 and is located between the bracket and a relatively long camera support 86. The spacer 85 and the support 86 are held in place by two bolts 88, one of which can be seen in FIG. 5a. Each bolt extends through a washer and lock washer combination, a hole 89 in the spacer and into a hole (not shown) in the spacer 86.

The surveillance camera 90 and its lens 92, which are of standard construction, are mounted on top of the support 86 by suitable threaded fasteners or other means (not shown). The lens 92 is pointed in the direction of the aforementioned glass window 22 through which window the lens can view an area outside the sphere. By selecting a spacer 85 of appropriate thickness, the optical centreline of the camera and lens can easily be located so that it passes through the centre of the spherical enclosure 12 and through the horizontal axis defined by the bolts 74. Also because the centre of curvature of the window 22 is located at the centre of the spherical enclosure, the optical centreline of the camera and lens also passes through the centre of the curvature of the window. In this way the picture being received by the camera will not be distorted by the window no matter what the pivoted position of the camera is about the horizontal axis.

Turning now to the support for the enclosure itself, in the embodiment of FIGS. 5 and 5a a sleevelike support 94 is provided and the length of this support can vary depending upon the particular application. The support 94 has threaded holes 95 located in an upper flange and bolts 96 extend through the holes 40 in the enclosure to attach the enclosure to this upper flange. If desired, an aluminum flange member 100 of L-shaped cross-section can be inserted between the head of the bolts 96 and the inner surface of the enclosure. As can be seen clearly from FIG. 5, the inner post 50 extends through the sleevelike support 94 and is spaced apart therefrom. This results in the inner post being mechanically isolated from the sleevelike support. In this way slight movements or vibrations of the enclosure or the sleevelike support 94 connected thereto will not be passed on to the inner post and the camera. This is a distinct advantage because when the housing unit is placed outdoors, wind conditions will often be in existence and the wind will invariably cause some movement of the enclosure despite its aerodynamic shape. However, despite the existence of a wind, the camera will be held quite motionless and will therefore be able to provide a clear picture to the viewer.

It will be appreciated that the short support 94 shown in the drawings could be connected to a long hollow post by means of the connecting flange 102 and the bolt holes 103 provided therein. Alternatively, the support 94 could be attached to the roof of a structure in some applications. Preferably the holes 103 are slotted to permit some adjustment to the position of the support about its vertical axis.

In order to provide optimal operating conditions for the camera and lens, it is desirable to provide an indoor-like environment in the enclosure 12. If the camera will be located in a cold weather climate, means are provided for heating the interior of the enclosure and this heating means can take the form of small electrical heaters 104 of known construction. The preferred form of heater comprises a number of known blanket heaters and they can be attached by adhesive to the bracket 60 in a location where they will not interfere with the adjustment of the camera. The heaters 104 are controlled by a thermostat as indicated in the circuit drawing referred to hereinafter. Preferably the thermostat will operate the heaters whenever the temperature in the enclosure reaches 10 degrees Celsius or lower.

Figure 8:
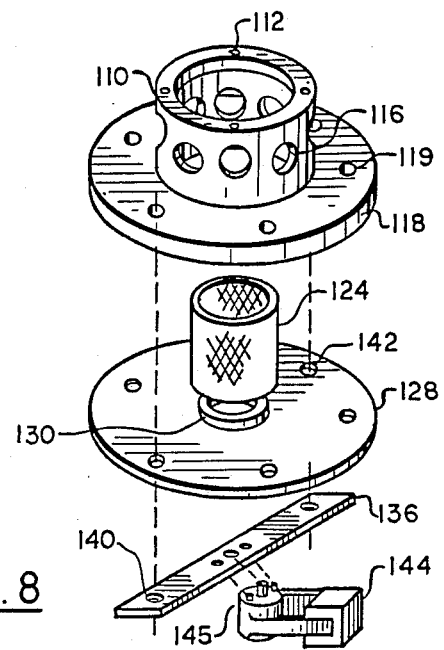
FIG. 8 is an exploded view showing the construction of several parts of the ventilating mechanism at the top of the housing unit.

There are also provided means for ventilating the interior of the enclosure so that the temperature therein does not exceed a maximum temperature. Temperature build-up in the enclosure may occur either as a result of warm weather outside the enclosure or as a result of the operation of the camera and its lens (or the motors for adjusting the camera described hereinafter). The ventilating means are illustrated in FIGS. 5 and 8 and the various parts thereof are mounted in an opening located in the upper section 18 of the enclosure. A cap member 106, which can be made of fiberglass and forms a partial sphere, extends over the opening 108 in the top of the enclosure. The cap member is mounted on a cylindrical aluminum mounting pedestal or support 110 having an outside diameter approximately equal to the diameter of the opening in the enclosure. The pedestal 110 has threaded holes 112 in the top thereof to receive bolts 114 used to attach the cap member 106. A number of holes 116 are formed about the circumference of the pedestal to permit the entry of air into and out of the enclosure. The pedestal 110 is connected to the enclosure by means of a bottom flange 118 having bolt holes 119 formed therein. In the illustrated embodiment, there are eight bolts 120, which are connected by nuts 121, extending through bolt holes in the enclosure and through the holes 119 to connect the pedestal. Preferably there is also an annular aluminum member 122 positioned on top of the enclosure and through which the bolts 120 extend. Located inside the pedestal 110 is a cylindrical member 124 made of expanded metal and forming a type of screen. The upper end of the member 124 fits into a circular cavity 125 at the top of the cap member. The member 124 supports the inside surface of a cylindrical filter 126 preferably made of fiberglass insulation material. The filter 126 not only keeps dust and dirt from entering into the enclosure 12 but also helps to maintain a warm temperature inside the enclosure in cold weather.

Extending over the bottom of the filter 126 and the pedestal 110 is an annular support plate 128. The plate 128 is connected to the pedestal 110 by means of the aforementioned bolts 120 and nuts 121. It is provided with an inner flange 130 that supports the bottom edge of the member 124. Attached to the plate 128 by two of the bolts 120 is a fan mounting bracket 136 through which the drive shaft for a fan 134 extends. The two bolts 120 that extend through the holes 140 in the bar 136 also extend through holes 142 in the plate 128. There is also a square plate 133 arranged between the plate 128 and the bracket 136 and connected by bolts to give added strength to the fan support. An electric motor 144 is connected to the bar or mounting bracket 136 by any suitable means such as two threaded studs 145 on the motor. As described hereinafter in connection with the circuit diagram, the fan and its motor 144 are operated by a thermostat so that the fan will operate whenever a certain temperature in the enclosure is reached, for example, 28 degrees Celsius.

The wiring for the electrical components of this embodiment is not shown but it will be understood that the electrical cable enters through the gap 52. Only a ⅜" diameter cable is required for the wires to operate the video camera, the lens, and the environmental controls. There is sufficient space provided by gap 52 to avoid any mechanical interference to the camera mounting.

Figures 6, 6A:
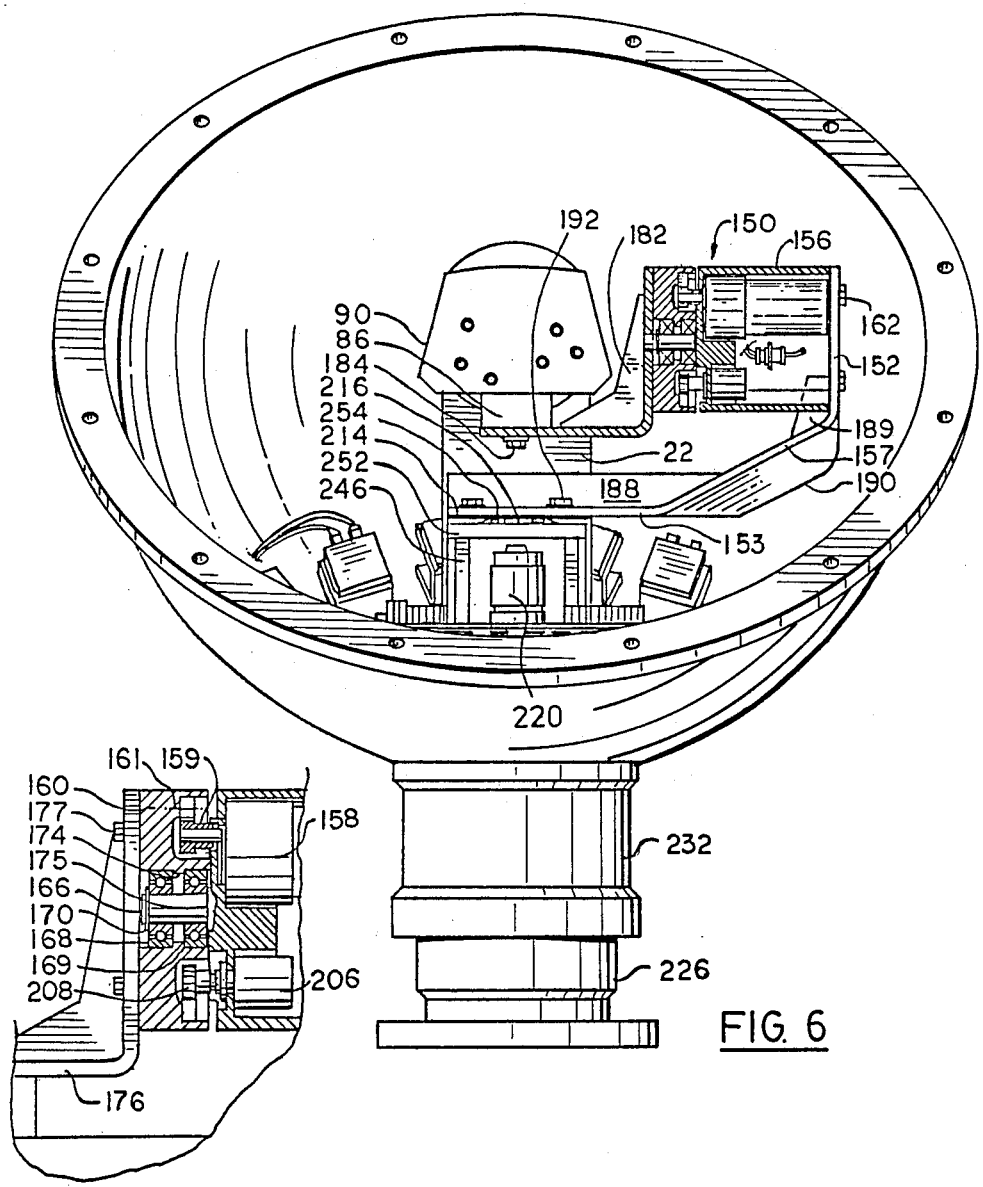
FIG. 6 is a side elevation, partially in section, of the embodiment of FIG. 3 wherein motors are provided to pan and tilt the surveillance camera.
FIG. 6A is a detail view of components in FIG. 6.
Figure 7:
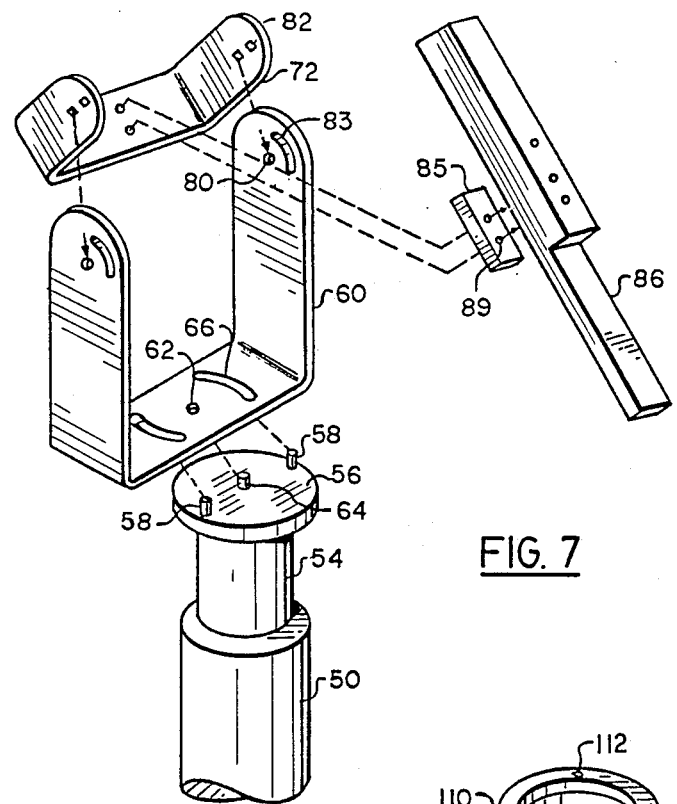
FIG. 7 is an exploded view showing several of the camera supporting parts and the inner post on which they are mounted.
Figure 14:
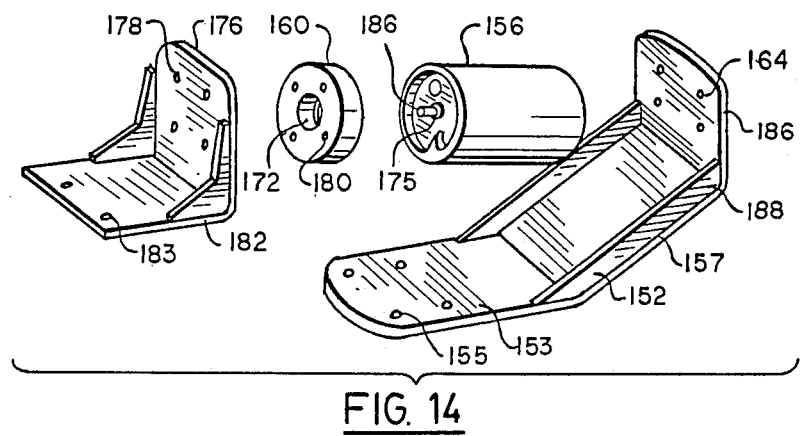
FIG. 14. is an exploded view showing several parts used in the embodiment of FIG. 3 to tilt the surveillance camera.
Figure 15:
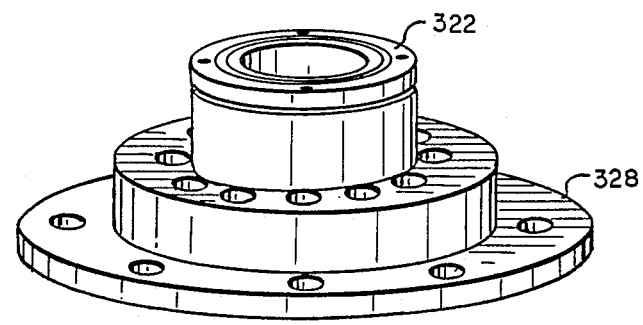
FIG. 15 is a perspective view of the rotor used in the camera mounting of FIG. 4.

Turning now to the power operated embodiment of the invention illustrated in FIGS. 3 and 6 of the drawings, there are shown power means for tilting the camera about a horizontal axis and further power means for panning the camera about a vertical axis which extends through the longitudinal centre of the inner post 38. As shown in FIG. 3, the inner post 38 is hollow and through it extends the electrical cable to operate the various motors and control systems for the unit and camera. A similar hollow post can also be used in the manual embodiment described above. The first power means, indicated generally by the reference 150 is mounted on a bracket member 152, the construction of which can be seen clearly from FIG. 14. This bracket member is connected to and is rotatable by the further power means indicated generally by reference 154. The two power means are constructed in a very similar fashion as will be apparent from the drawings and accordingly the detailed description will be directed primarily to the construction of the first mentioned power means shown in FIG. 6 and FIG. 14 and those features of the power means 154 that differ from the power means 150. The power means for tilting includes an electrical drive gear motor 158, a small driving gear 159 and a larger gear 161 having internal teeth. The gear motor 158 is mounted inside a motor housing or stator 156 that is connected to the bracket 152 by means of bolts or studs 162. Four holes 164 are provided in the bracket 152 to accommodate these bolts. An integral centre shaft 166 extends from the closed end of the stator 156 and on this shaft a rotor 160 is rotatably mounted. Two sets of ballbearings 168 and 169 are provided to mount the rotor. The bearings 168 are held in place on the shaft by means of a retaining ring 170. The hole 172 in the rotor has a reduced width in its centre formed by a rib 174. This rib keeps the two ballbearings a suitable distance apart. A step 175 is formed at the bottom of the shaft to hold the bearing 169 in place. Connected to one side of the rotor 160 is a smaller L-shaped bracket 176 that forms part of the camera support mechanism for the camera 90. Standard bolts 177 extend through four holes 178 in the bracket and into threaded holes 180 in the rotor in order to attach the bracket. In order to make the bracket 176 quite rigid, it can have two lip braces 182 welded thereto. The bracket 176 has holes 183 therein for passage of bolts 184 therethrough. These bolts connect a camera support 86 of the same type as is illustrated in FIG. 7.

Returning to the construction of the large bracket member 152, this member includes a horizontal section 153 having four bolt holes 155 therein, a sloping section 157 and a vertical section 186. In order to make this bracket very rigid, it is provided with a two lip braces 188. It can also have a central rib or brace 190 extending downwardly from the sloping section 157. Four bolts 192 attach the bracket to a rotor 194 of the power means 154.

Figure 12:
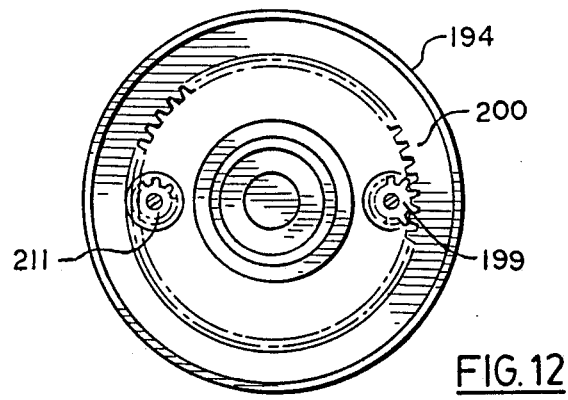
FIG. 12 is a detail view taken along the line XII—XII of FIG. 3 and showing the gear with internal teeth mounted in the rotor used to pan the camera.
Figure 13:
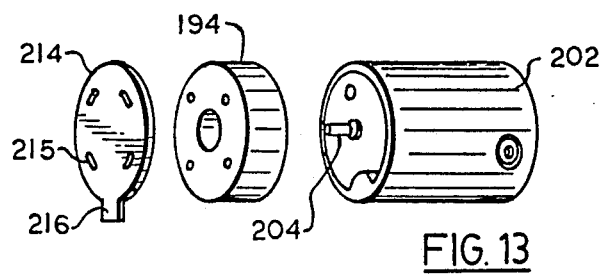
FIG. 13 is an exploded view showing the construction of major parts used to rotatably mount the camera, the parts in the view being arranged with their centre axis horizontal.

The construction of the power means for panning the camera support mechanism about a vertical axis indicated at 196 includes an electrical drive gear motor 198, a driving gear 199, and a larger driven gear 200 with internal teeth. The construction and engagement of these gears can be seen clearly from FIG. 12. The motor 198 is mounted inside a motor housing or stator 202 that is detachably mounted by bolts (not shown) to the top of the inner post 38. It will thus be seen that the stator 202 with its vertical shaft 204 and the rotor 194 provides means for mounting the camera support mechanism for rotation about the selected vertical axis at 196.

Both the power means for tilting the camera and the power means for panning the camera are optionally provided with potentiometer controls so that the unit can be programmed to rotate or tilt the camera to one or a number of preselected positions. The potentiometer for tilt control is shown at 206 in FIG. 6a and this potentiometer is connected by a shaft to a gear 208 that engages the large internal gear 161. Such control mechanisms are well known in the control art and it is deemed unnecessary to describe its construction in any further detail herein. The potentiometer control for the scan function is shown in FIG. 3. This potentiometer is connected by a shaft to a gear 211 (see FIG. 12) where it engages the large internal gear 200. A plug and socket connection 212 for the potentiometer and the electric motor 198 is connected to the inside of the stator 202.

Mounted on top of the rotor 194 is a cam plate 214, the function of which is described hereinafter. This plate, which has the same diameter as the rotor, has holes 215 therein for passage of the bolts 192. The plate has a radially outwardly extending finger 216 for triggering microswitches.

Figure 9:
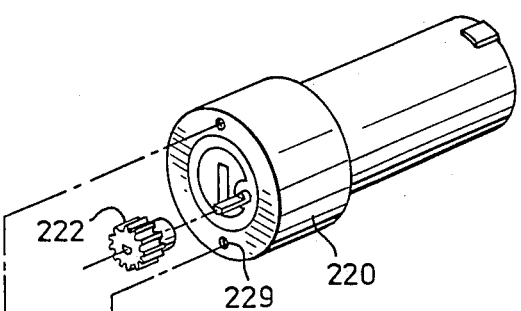
FIGS. 9 and 10 are exploded views showing the mounting arrangement for the motor that rotates the enclosure.
Figure 10:
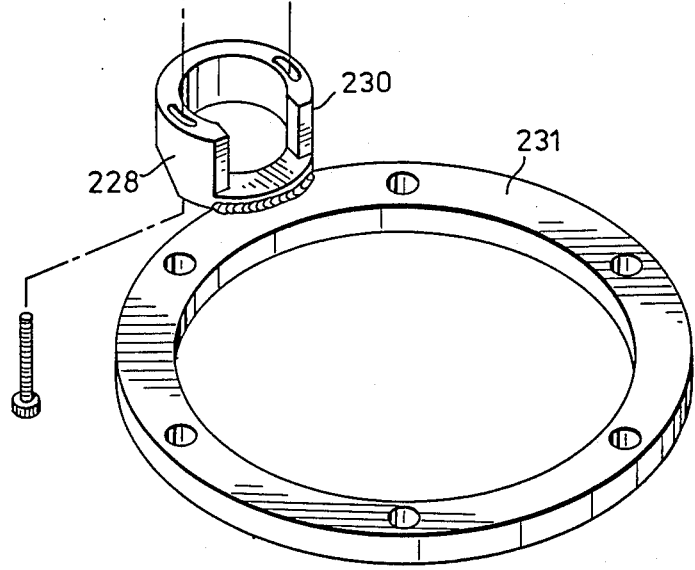
Figure 11:
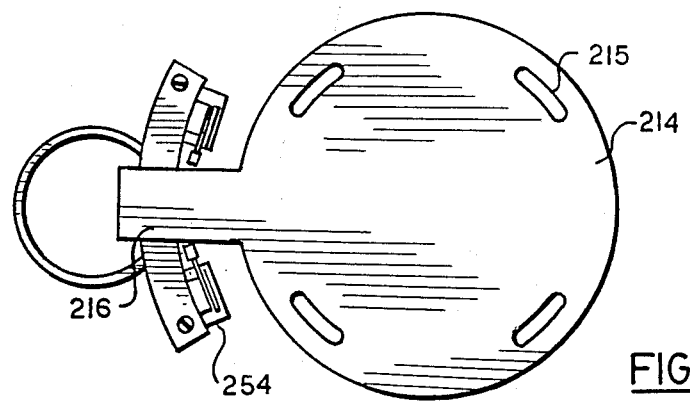
FIG. 11 is a detail view taken along the line XI—XI of FIG. 3, this view showing the mounting for the microswitches that control the rotation of the spherical enclosure.

Because of the need to mechanically isolate the camera and the camera mount from the enclosure 12, separate power means are provided for rotating the enclosure about the same vertical axis as that around which the camera rotates. In addition, there are control means for operating this separate power means in order to maintain the window 22 in front of the lens 92. The separate power means for rotating the the enclosure is indicated generally at 218 and this power means includes an electric gear drive motor 220, a small driving gear 222 and a large spur gear 224 that is rigidly mounted at the top end of the sleevelike support 226. The mounting arrangement for the electric motor 220 is shown in FIGS. 3, 9, and 10. The motor is mounted on top of a "C" shaped support member 228 that has a suitable opening for passage of the drive shaft of the motor and to accommodate the gear 222. The member 228 is partially cut away at 230 to accommodate the edge of the spur gear 224 and to permit engagement between it and the driving gear 222. The support member 228 can be welded to a metal ring 231 that forms part of the rotatable mounting for the enclosure. Bolts extend through slots in the member 228 and into threaded holes 229 to connect the motor to the top of the member 228.

The enclosure 12 shown in FIG. 3 is rotatably mounted on the support 226 which has arranged thereon a rotatable, open-ended cylinder 232. Inside this cylinder are two sets of ball bearings 233 and 234 separated by spacers 236. An internal open-ended cylinder 238 forms an upper section of the support 226 and is slidably received inside a bottom section 240 having a generally L-shaped cross-section. Set screws 241 can be used to tightly hold the member 238 in the bottom section 240. A mounting ring 242 is attached by screws 243 to the bottom end of the cylinder 232 in order to hold the bearing 233 in place. The top end of the cylinder 232 is rigidly clamped to the bottom of the enclosure by means of the aforementioned metal ring 230 and suitable bolts 244 that pass through the holes 40 in the enclosure. It will thus be seen that because the motor 220 is mounted on the rotatable ring 230 and the spur gear 224 is fixed against rotation, rotation of the small gear 222 by the motor will result in rotation of the spherical enclosure. In addition, as will be clear hereinafter, any movement of or vibration of the enclosure will not be transmitted to or affect the camera and its lens.

The control mechanism for operating the motor 220 is mounted on a curved metal, preferably aluminium, bracket 252 which is mounted on the ring 231 by two spacers 246 each having a threaded, axially extending hole at the top end and a threaded male connector at the bottom end. The bracket 252 is attached to each spacer 246 by a screw 250. Two microswitches 254 are mounted on the bracket 252. On top of each microswitch is an actuator that is located for contact with the finger 216 on the cam plate. The operation of this control means will be described further hereinafter with reference to the circuit diagram.

Also located inside the enclosure 12 of FIG. 3 is an assembly rail 256 having a number of electrical terminals for attachment of the various wires that operate the camera, the lens, and the motors described above. Preferably the assembly rail is attached by screws or bolts to the enclosure.

Another optional but preferred feature is a combination blower and heater 260 arranged above the window 22. The heater/blower 260 can be operated whenever required in order to maintain the window clear and free from frost. It can be of any standard construction and therefore a detailed description thereof is deemed unnecessary. In the illustrated embodiment it is attached to the lower section of the spherical enclosure by any suitable means such as bolts (not shown).

In order to prevent ice build-up around the bottom end of the cylinder 232, which build-up might prevent the enclosure from rotating, standard blanket heaters 262 may be placed around the circumference of the bottom section 240 of the support. As with the other blanket heaters, these heaters can be attached by adhesive to the metal section 240.

Figure 17:
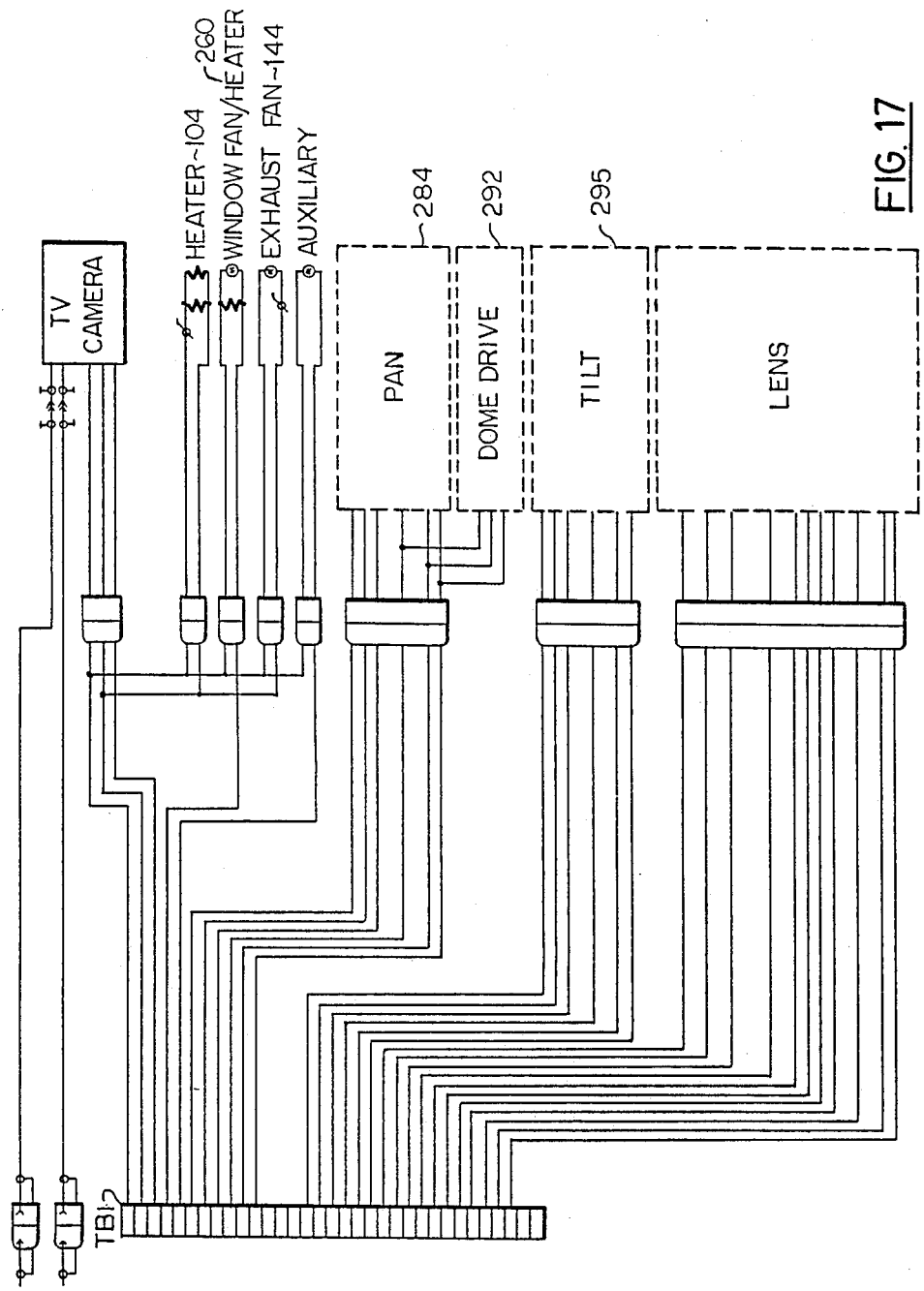
FIG. 17 is a general circuit diagram illustrating the electrical circuits required to operate the motor driven camera support of the embodiment of FIGS. 3 and 6.
Figure 18:
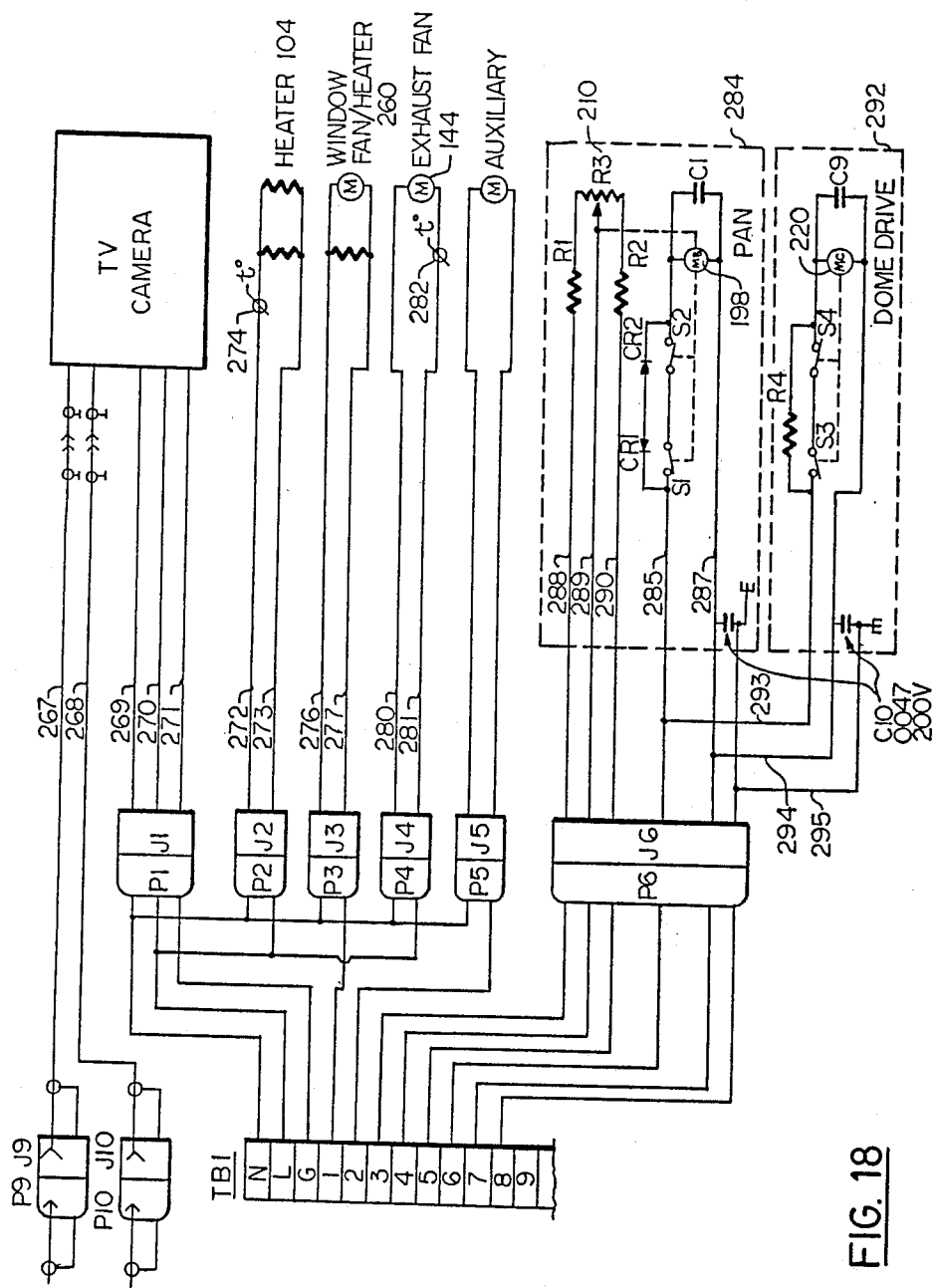
FIG. 18 is a detailed circuit diagram showing details of the circuits on the left hand side of FIG. 17.
Figure 19:
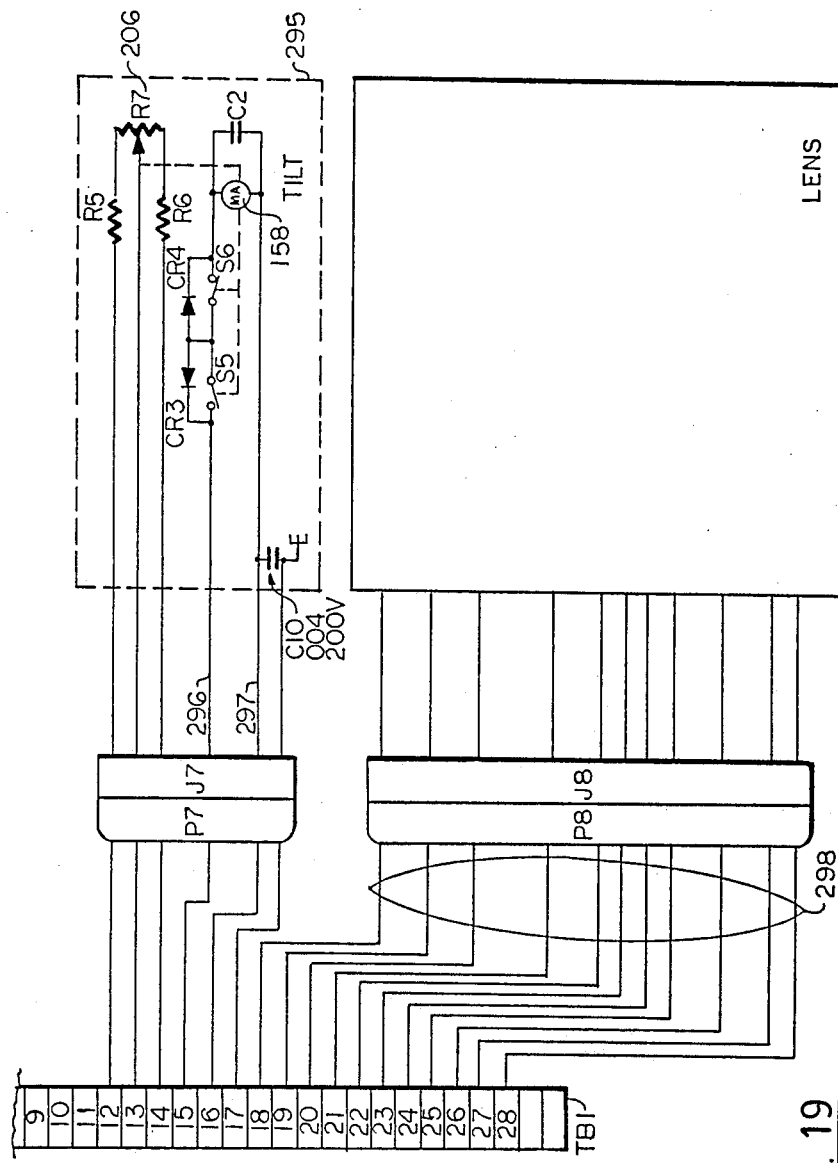
FIG. 19 is a detailed circuit diagram showing details of the circuit used to tilt the camera.

FIGS. 17 to 19 illustrate the electrical circuits that can be used to operate the surveillance camera systems described above. The illustrated circuits are all located within the enclosure 12. The electrical terminals illustrated at the bottom of FIGS. 17 to 19 are located at the assembly rail 256 shown in FIG. 3. These terminals are connected by a bundle of wires or a cable 266 to a standard receiver (not shown) located outside the housing. The receiver is of well known construction and does not form part of the present invention. It is hard wired to an operating terminal for the camera unit. The receiver can be similar to that sold by Pelco Sales, Inc. of Fresno, Calif., for its surveillance cameras. The preferred receiver is designed to operate a 12 volt D.C. system.

In FIG. 17 the reference letter P indicates a plug while the reference letter J indicates a jack. The five electrical lines 267 to 271 are standard lines for the operation of a television camera. As the television or surveillance camera is of well known construction, as is its operation, a detailed description thereof herein is deemed unnecessary. The lines 272 and 273 extending from jack J2 operate the heater 104 for the spherical enclosure. In the line 272 there is a thermostat 274 which can be the type made by Klixon and bearing part number 20640L58318-50L80-1W29V. The thermostat will operate the heater 104 whenever the temperature in the enclosure falls to 10 degrees Celsius or less. The heater itself can comprise a number of blanket heaters such as those made by Benchmark and bearing part number BF1031 115V 40W. In one preferred embodiment of applicant's unit there are six such blanket heaters.

Electrical lines 276 and 277 extending from the jack J3 operate the blower and heater unit 260 which preferably is a 115 volt, 250 watt unit. The blower and heater are simply operated from a remote switch, being turned on whenever required by the operator.

Electrical lines 280 and 281 extending from jack J4 operate the exhaust fan motor 144. The operation of this motor is controlled by a thermostat 282 which operates the motor when the temperature in the spherical enclosure exceeds 28 degrees Celsius. The thermostat can be the type sold by Klixon under part number 2064F58148-50F901.OR84V.

The illustrated auxillary circuit is optional and it could, for example, operate a windshield wiper for the window 22 if desired.

The circuits and components in the dashed outline at 284 operate and control the motor 198 which is able to pan the camera. Because the motor is a D.C. motor, it is simply necessary to change the voltage of the current through the motor in order to change the speed thereof. Also, by changing the polarity, the direction of rotation can be changed. Standard one direction diodes in the circuit are indicated by references CR1 and CR2. A capacitor C1 which in one preferred embodiment has a capacity of 0.1 microfarad is connected in the motor circuit and acts as a filter. If switch S1 is closed the current in line 285 will flow through the switch and through the diode CR2 to the motor. At this time the current cannot flow through the switch S2 which is open nor can it pass through the diode CR1 because of its direction. This will result in the motor 198 (MB) turning in a certain direction, say clockwise. However, if the controls are operated to close switch S2 and open switch S1 and reverse the direction of the current, the current will then flow through line 287, through the motor, through switch S2 and through the diode CR1. This will cause the motor to turn in the opposite direction, that is, counter-clockwise. The capacitor C10 is a standard filter device provided to protect the circuit from RF noise.

The three electrical lines 288, 289 and 290, resistors R1 and R2 and the potentiometer R3 are optional and are only required in order to programme the panning operation. In other words, with this additional circuit it is possible to use a known memory control system and to programme it so that the camera will pan to certain desired positions. The potentiometer R3 is shown in FIG. 9 and in a preferred embodiment it is a ten turn unit of 5K ohms capacity. The resistors are provided to balance the circuit only and the use thereof is well known in the control system art.

The electrical circuit for controlling the rotation of the dome or spherical enclosure is outlined at 292. It will be noted that this circuit has the same power source as the panning motor 198 because lines 293 and 294 as well as line 295 are connected directly to corresponding lines in the circuit for the motor 198. As a result of this arrangement, the camera enclosure will always rotate in the same direction about the vertical axis as the camera. The motor 220 can be that sold by Brevel bearing part number 713-982924-702 15-84.

The switches S3 and S4 are normally closed. These switches S3 and S4 are the two microswitches 254 which are actuated by the finger 216 on the cam plate.

One of the switches, say S3, can be operated by the finger of the cam plate when rotating in a clockwise direction and the other switch, say S4, is operated when rotating in the counter-clockwise direction.

When the lines 285 and 287 are energized then both the camera and the dome enclosure will start to rotate in the same direction but the dome enclosure is designed to rotate at a greater speed than the camera. This will cause the finger 216 on the cam plate to eventually actuate either switch S3 or S4 depending on direction, and opening the switch, and break line 293. The current will then pass through the resistor R4 slowing the rotation of the dome drive motor 220. The dome enclosure will now rotate at a slower speed than the camera until the finger on the cam releases S3 or S4 again closing the circuit. This control system ensures that the camera lens and window 12 are always aligned. In a preferred embodiment, the resistance R4 is a 10 ohms resistor and the filter capacitor C9 is 0.1 microfarad in size.

The circuit and components for operating and controlling the tilt motor 158 are indicated in the outline 295. As will be seen by comparing the circuit in outline 295 to the circuit in outline 284, the two circuits and their components are substantially the same and, in fact, the two circuits operate in essentially the same manner. Again, the control circuit that includes the resistors R5 and R6 and the potentiometer R7 is optional, depending on whether or not it is desired to programme the camera to move to certain preset locations. The potentiometer R7 is indicated by reference 206 in FIG. 6A. The speed of rotation of the motor 158 will depend upon the voltage in lines 296 and 297. By switching the polarity in these lines, the direction of rotation of the motor can be changed as explained above.

The group of wires indicated generally at 298 are provided to operate the camera lens which is a standard lens of well known construction. It includes motors for operating the iris of the lens, for controlling the zoom function and for focusing the lens. As the electrical circuits for the operation of these motors are well known, they are not been illustrated herein. The lens and its operation forms no part of the present invention.

Figure 4:
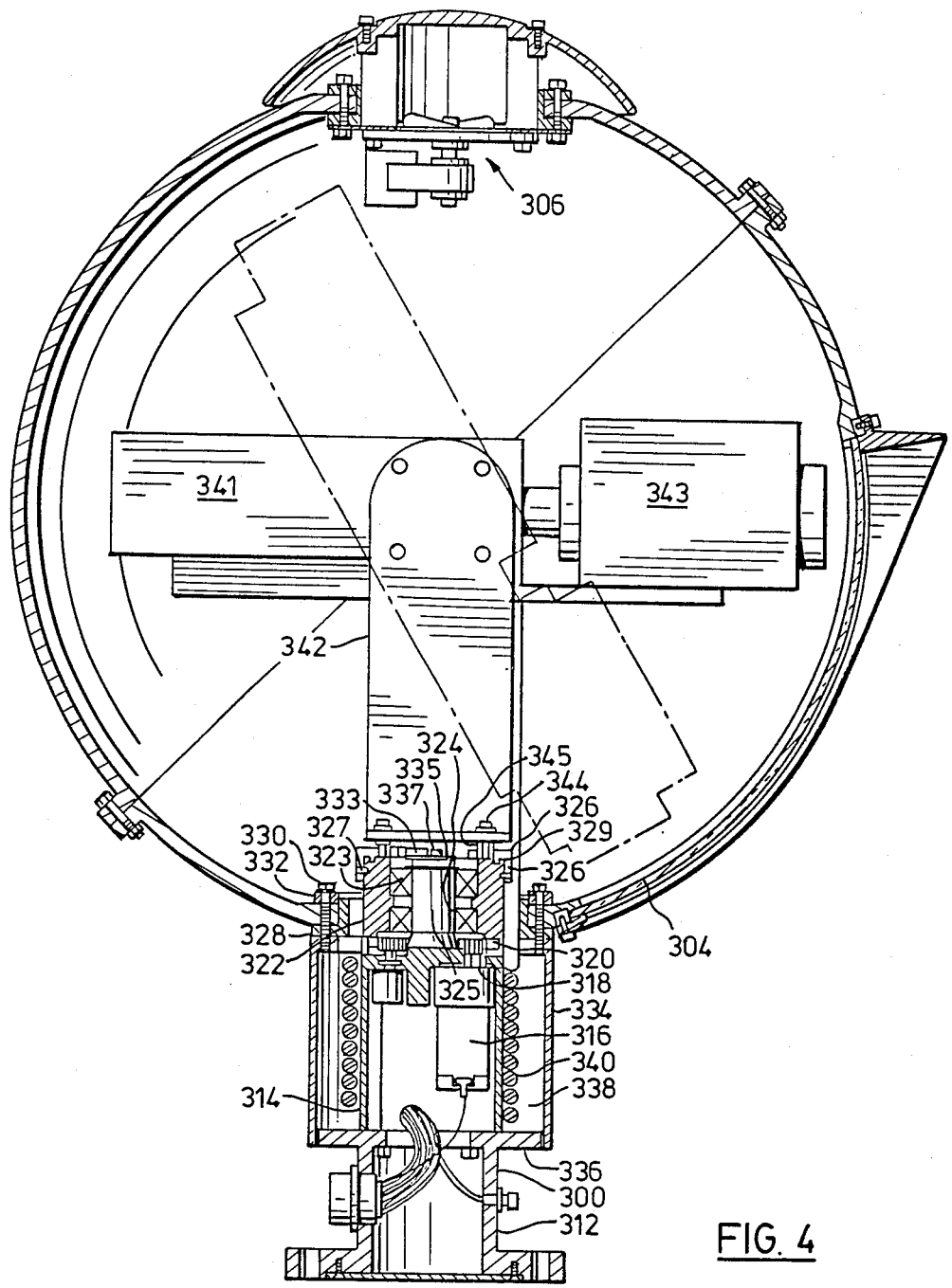
FIG. 4 is a sectional elevation showing a further embodiment of a camera housing unit wherein the spherical enclosure and the camera are supported by the same post.

In the embodiment of FIG. 4 the camera mounting and camera and the spherical enclosure are attached to a rotor 322 which is free to rotate around a vertical shaft 325. This shaft is part of stator 314 that is detachably mounted on a pedestal 312. This embodiment is suitable for some surveillance camera applications, particularly when use of shorter focal length lenses or less severe wind/ice conditions indicate that vibration would not be as severe a problem. The spherical enclosure 302 and its window 304 are constructed in the same manner as the versions described above. The ventilating mechanism 306 at the top of the enclosure is identical to that used in the embodiment of FIG. 5.

Figure 16:
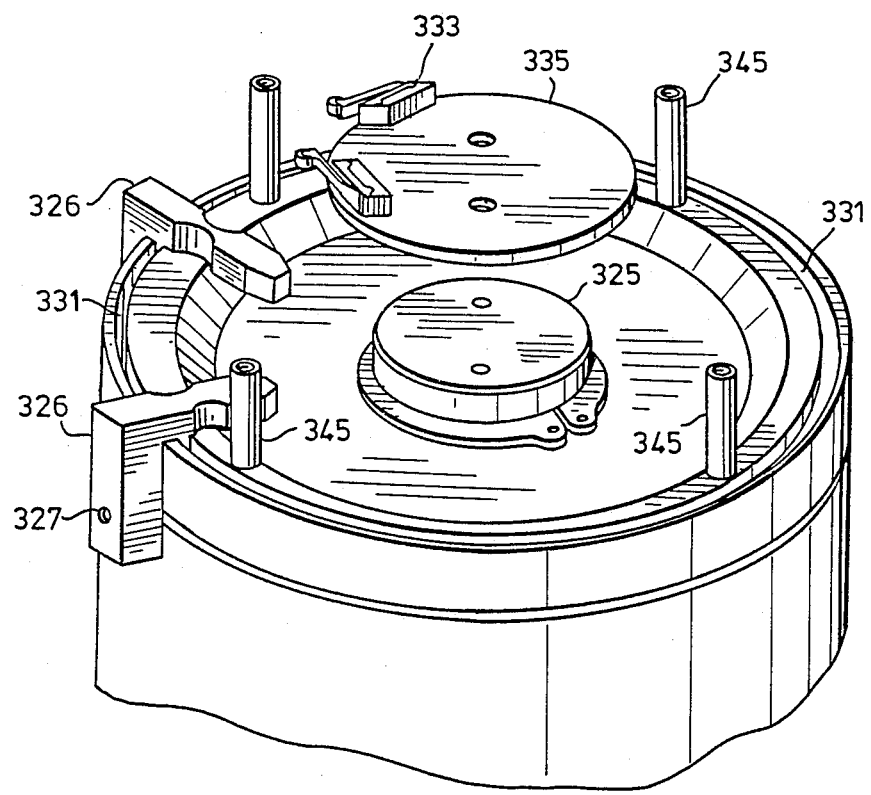
FIG. 16 is an exploded view showing the construction of cams and microswitches operated thereby which limit the rotation of the camera enclosure.

The stator 314 contains an electric gear drive motor 316. The motor 316 has fixed on its shaft a driving gear 318 which engages a larger gear 320 with internal teeth. The large gear is bolted to the rotor 322. Inside the rotor are two sets of bearings 323 and 324 that extend around the central shaft 325. It will be understood that the bearings are held in place in a manner the same as the bearings used with the panning mechanism of the embodiments described above. Adjustably mounted on the rotor are two cam members 326 that are fixed relative to the rotor by set screws 327. Each cam 326 is provided to limit the rotation of the camera enclosure. Each cam has a downwardly extending step 329 that is placed in a groove 331 formed in the top of the rotor. Two microswitches 333 are mounted on round plate 335 which is fixed by two bolts 337 to the top of the shaft 325. When one of the cams 326 engages a microswitch 333, the switch 333 is opened and further rotation of the camera in that direction is prevented. The camera can then be rotated in the opposite direction until the other cam 326 is reached. The rotor 322 has a flange 328 that supports the camera enclosure. Connecting bolts 330 extend through an annular metal ring 332, through holes in the enclosure, through the flange 328 and into threaded holes in a skirt member 334. The skirt member extends down to a flange extending around the top of the pedestal 312. Located above this flange 336 in an annular space 338 is a coiled cable 340 which contains the electrical wires for operating the camera 341, the lens 343 and the tilting motor (not shown). A panning bracket 342 is detachably connected by bolts 344 to the top of the rotor. The bolts 344 extend through tubular spacers 345 shown in FIG. 16. These spacers are required to provide head room for the cams 326. They permit the cams to be removed and adjusted as may be required from time to time. The bracket 342 is connected to the housing for the tilting motor in the same manner as described above.

It will be appreciated by those skilled in this art that various modifications and changes can be made to the illustrated camera housing units and camera supports without departing from the spirit and scope of this invention. Accordingly, all such modifications and variations as fall within the scope of the appended claims are intended to be part of this invention.

I therefore claim:

1. A combination of a surveillance camera and a housing unit comprising:
   a surveillance camera;
   adjustable surveillance camera support means supporting said surveillance camera, including a post, first means for tilting said camera in a vertical plane about a horizontal axis, and second means mounted on said post for panning said camera about a vertical axis;
   a protective, substantially opaque enclosure surrounding said suppport means and camera, having an elongate opening therein, said post extending into said enclosure;
   a sleevelike support for said enclosure and attached thereto, said post extending through said sleevelike support and being mechanically isolated and spaced apart therefrom; and
   a separate, elongate, transparent glass window provided in and attached to said enclosure and forming a cylindrical surface of uniform curvature, the centre of curvature of said surface being located on the optical centreline of said camera in all possible tilt positions for said camera about a said horizontal axis, said window covering said elongate opening.

2. The combination of a surveillance camera and a housing unit comprising:
   a surveillane camera;
   adjustable surveillance camera support means supporting said surveillance camera including a post, a first adjustable U-shaped bracket connected to said surveillance camera and pivotable about a horizontal axis extending through the optical centreline of said camera and a second adjustable U-shaped bracket mounted to said post and pivotable about a vertical axis, said first bracket being mounted on said second bracket;
   a protective, substantially opaque enclosure surrounding said first and second U-shaped brackets and said camera and having an elongate opening therein, said post extending into said enclosure but spaced apart therefrom;
   a sleevelike support for said enclosure and attached thereto, said post extending through said sleevelike support and being mechanically isolated therefrom;
   a separate, elongate, transparent glass window provided in and attached to said enclosure and defining a curved surface, the center of curvature of said surface being located on the optical centerline of said camera, said window covering said elongate opening;
   wherein said first U-shaped bracket permits said camera to be pivoted about said center of curvature of said curved surface in a vertical plane.

3. The combination of claim 2 including means for heating the interior of said enclosure and means for ventilating the interior of said enclosure whereby said camera can be maintained within a preselected temperature range when the housing unit is located outdoors.

4. A surveillance camera housing unit comprising:
   an inner post;
   means for adjustably mounting a surveillance camera at an end of said post;
   a protective enclosure for said camera; and
   an exterior sleevelike support on which said enclosure is mounted and through which said inner post extends,
   wherein said sleevelike support is mechanically isolated and spaced apart from said inner post.

5. A housing unit according to claim 4 wherein said mounting means includes first power means for tilting said surveillance camera about a horizontal axis and second power means for panning said camera about a vertical axis, said first power means being mounted on a bracket member that is connected to and rotatable by said second power means, said second power means being mounted on said inner post.

6. A housing unit according to claim 5 including electrical means for sensing the existing position of rotation of said camera around said vertical axis, said sensing means enabling said second power means to pan said camera to a desired position and then stopping further rotation.

7. A surveillance camera housing unit acording to claim 5 wherein said enclosure is substantially spherical and said unit includes means for heating the interior of said enclosure and means for ventilating the interior of said enclosure to maintain a temperature range similar to an indoor environment.

8. A surveillance camera housing unit comprising:
   an inner post;
   means for adjustably mounting a surveillance camera at an end of said post, including first power means for tilting said surveillance camera about a horizontal axis and second power means for panning said camera about a vertical axis, said first power means being mounted on a bracket member that is connected to and rotatable by said second power means, said second power means being mounted on said inner post;
   a protective enclosure for said camera having a separate glass window arranged therein;
   third power means for rotating said protective enclosure;
   control means for operating said third power means so that said window is constantly in front of the lens of said surveillance camera;
   an exterior sleevelike support on which said enclosure is mounted and through which said inner post extends, wherein said sleevelike support is mechanically isolated and spaced apart from said inner post.

9. A housing unit according to claim 8 wherein said third power means comprises a drive gear motor mounted in said protective enclosure, said drive gear motor being supported on a bracket connected to one side of said enclosure and having a driving gear in engagement with a fixed gear mounted at an end of said sleevelike support disposed within said enclosure.

10. A surveillance camera housing unit comprising:
  an inner post;
  a first support bracket connected to an end of said post;
  a second support bracket pivotably connected to said first support bracket and having means for attaching a surveillance camera thereto, said second support bracket being pivotable about an axis perpendicular to said inner post;
  a protective enclosure for said camera surrounding said first and second support brackets; and
  an exterior sleevelike support on which said enclosure is mounted and through which said inner post extends,
  wherein said sleevelike support extends parallel to said inner post and is spaced apart therefrom.

11. A surveillance camera housing unit according to claim 10 including means for adjustably connecting said first support bracket to said end of said post, said connecting means permitting manual rotation of said first support bracket about the central longitudinal axis of said post.

12. A surveillance camera housing unit according to claim 10 wherein said enclosure is spherical and a surveillance camera is attached to said second support bracket with the optical centreline thereof extending through the centre of said enclosure.

* * * * *